(12) United States Patent
Smith

(10) Patent No.: US 9,127,957 B2
(45) Date of Patent: Sep. 8, 2015

(54) INTERACTIVE DAY PLANNER

(71) Applicant: Cubic Corporation, San Diego, CA (US)

(72) Inventor: Gavin Ritchie Smith, Crawley (GB)

(73) Assignee: Cubic Corporation, San Diego, CA (US)

( * ) Notice: Subject to any disclaimer, the term of this patent is extended or adjusted under 35 U.S.C. 154(b) by 24 days.

(21) Appl. No.: 14/515,244

(22) Filed: Oct. 15, 2014

(65) Prior Publication Data

US 2015/0112592 A1  Apr. 23, 2015

Related U.S. Application Data

(60) Provisional application No. 61/892,229, filed on Oct. 17, 2013.

(51) Int. Cl.
*G01C 21/34* (2006.01)

(52) U.S. Cl.
CPC .......... *G01C 21/343* (2013.01); *G01C 21/3407* (2013.01); *G01C 21/3476* (2013.01)

(58) Field of Classification Search
CPC ...... G01C 21/343; G01C 21/26; G01C 21/34; G01C 21/3407; G01C 21/3476; G06Q 10/047; G06Q 10/02; G06Q 10/025
USPC .......................... 701/537, 420, 424, 425, 426
See application file for complete search history.

(56) References Cited

U.S. PATENT DOCUMENTS

| | | | | |
|---|---|---|---|---|
| 8,676,504 B2* | 3/2014 | Baker et al. | ................... | 701/522 |
| 2002/0174003 A1* | 11/2002 | Redmann et al. | ................. | 705/8 |
| 2006/0184313 A1* | 8/2006 | Butler, Jr. | ...................... | 701/200 |
| 2007/0073562 A1* | 3/2007 | Brice et al. | ......................... | 705/5 |
| 2010/0280853 A1* | 11/2010 | Petralia et al. | .................... | 705/5 |
| 2013/0041696 A1* | 2/2013 | Richard | ............................ | 705/5 |
| 2013/0261957 A1* | 10/2013 | Mahapatro et al. | ........... | 701/426 |
| 2013/0282283 A1* | 10/2013 | Bondesen et al. | ............ | 701/537 |
| 2014/0114566 A1* | 4/2014 | Ridgeway | ..................... | 701/426 |
| 2014/0304014 A1* | 10/2014 | Lee et al. | .......................... | 705/5 |

* cited by examiner

*Primary Examiner* — Rodney Butler
(74) *Attorney, Agent, or Firm* — Kilpatrick Townsend & Stockton LLP

(57) ABSTRACT

A method for producing an itinerary may include receiving a request for an itinerary from a remote device. The request includes points of interest to be included in the itinerary and a time or time range. The method includes communicating with remote systems to obtain information related to the points of interest. An itinerary is produced that includes the points of interest and is organized based on the information and the time. A suggested transit route is provided having directions to the points of interest. The itinerary may be provided to the remote device. A subsequent itinerary may be produced based on the information. Data from a plurality of itineraries is aggregated and includes a date of a visit, a time of the visit, or an estimated number of people for the visit. A portion of the data may be provided to a point of interest.

20 Claims, 5 Drawing Sheets

INTERACTIVE DAY PLANNER

CROSS-REFERENCES TO RELATED APPLICATIONS

This Application claims priority to U.S. Provisional Patent Application No. 61/892,229 filed Oct. 17, 2013, entitled "INTERACTIVE DAY PLANNER," the entire disclosure of which is hereby incorporated by reference, for all purposes, as if fully set forth herein.

BACKGROUND OF THE INVENTION

Travelers often make itineraries to help schedule visits to new locations. Oftentimes, due to unfamiliarity with an area, a traveler must spend a significant amount of time and effort researching attractions and/or other points of interest. Travelers making itineraries may wish to know hours of operation, cost, times when the attractions are least busy, travel times, as well as other information. Such planning can be time consuming for travelers and makes it much more difficult to plan a visit to an attraction.

Attractions and other points of interest oftentimes must plan to allocate their resources, such as staff, based on past visitation levels. For example, estimates of a day's customer levels may be based on the previous year's sales for that day. Such sales figures may not yield accurate predictions, especially in light of different weather, local events taking place, and other factors that may vary from year to year. This can make it difficult for a business to adequately plan ahead.

BRIEF SUMMARY OF THE INVENTION

Embodiments of the invention provide systems and methods for producing itineraries based on a selection of one or more points of interest. The itinerary and/or information from the itinerary may be provided to visitors and to the points of interest for planning purposes.

In one aspect, a method for producing an itinerary and travel route based on a selection of a number of points of interest is provided. The method may include receiving a request for an itinerary from a remote device. The request may include a plurality of points of interest to be included in the itinerary, the request further including a time or time range. The method may also include communicating, using a communications interface, with one or more remote systems to obtain information related to the plurality of points of interest. The information obtained from the one or more remote systems may be stored in a database. The method may further include producing, using a processor, an itinerary that includes the plurality of points of interest. The itinerary may be organized based at least in part of the information obtained from the one or more remote systems and the time or time range. A suggested transit route may be provided having directions to at least one of the plurality of points of interest using a transit system. The method may further include providing the itinerary to the remote device. A subsequent itinerary may be produced based at least in part on the information obtained from the one or more remote systems that is stored in the database. Data from a plurality of itineraries may be aggregated. The data may include one or more of a date of a visit, a time of the visit, or an estimated number of people for the visit. The method may also include providing at least a portion of the data to one of the plurality of points of interest.

In another aspect, a non-transitory computer-readable medium having instructions embedded thereon for converting a barcode media into a magnetic stripe media is provided. The instructions may include computer code for causing a computing device to receive a request for an itinerary from a remote device. The request may include a plurality of points of interest to be included in the itinerary, as well as a time or time range. The instructions may also include computer code for causing a computing device to communicate with one or more remote systems to obtain information related to the plurality of points of interest and to store the information obtained from the one or more remote systems in a database. The instructions may further include computer code for causing a computing device to produce an itinerary that may include the plurality of points of interest. The itinerary may be organized based at least in part of the information obtained from the one or more remote systems and the time or time range. The instructions may include computer code for causing a computing device to provide a suggested transit route having directions to at least one of the plurality of points of interest using a transit system and to provide the itinerary to the remote device. The instructions may also include computer code for causing a computing device to produce a subsequent itinerary based at least in part on the information obtained from the one or more remote systems that is stored in the database. The instructions may include computer code for causing a computing device to aggregate data from a plurality of itineraries. The data may include one or more of a date of a visit, a time of the visit, or an estimated number of people for the visit. The instructions may include computer code for causing a computing device to provide at least a portion of the data to one of the plurality of points of interest.

In another aspect, a server configured to produce an optimized itinerary based on a selection of a number of points of interest is provided. The server may include a communications interface configured to enable the transfer of information and a memory configured to store the information obtained from one or more remote systems. The server may also include a processor configured to receive, using the communications interface, a request for an itinerary from a remote device. The request may include a plurality of points of interest to be included in the itinerary as well as a time or time range. The processor may also be configured to communicate, using the communications interface, with the one or more remote systems to obtain information related to the plurality of points of interest. The processor may be configured to store the information obtained from the one or more remote systems in the memory and to produce an itinerary that includes the plurality of points of interest. The itinerary may be organized based at least in part of the information obtained from the one or more remote systems and the time or time range.

The processor may be further configured to provide, using the communications interface, a suggested transit route having directions to at least one of the plurality of points of interest using a transit system and to provide, using the communications interface, the itinerary to the remote device. The processor may also be configured to produce a subsequent itinerary based at least in part on the information obtained from the one or more remote systems that is stored in the database. The processor may be configured to aggregate data from a plurality of itineraries, the data including one or more of a date of a visit, a time of the visit, or an estimated number of people for the visit. The processor may also be configured to provide, using the communications interface, at least a portion of the data to one of the plurality of points of interest.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
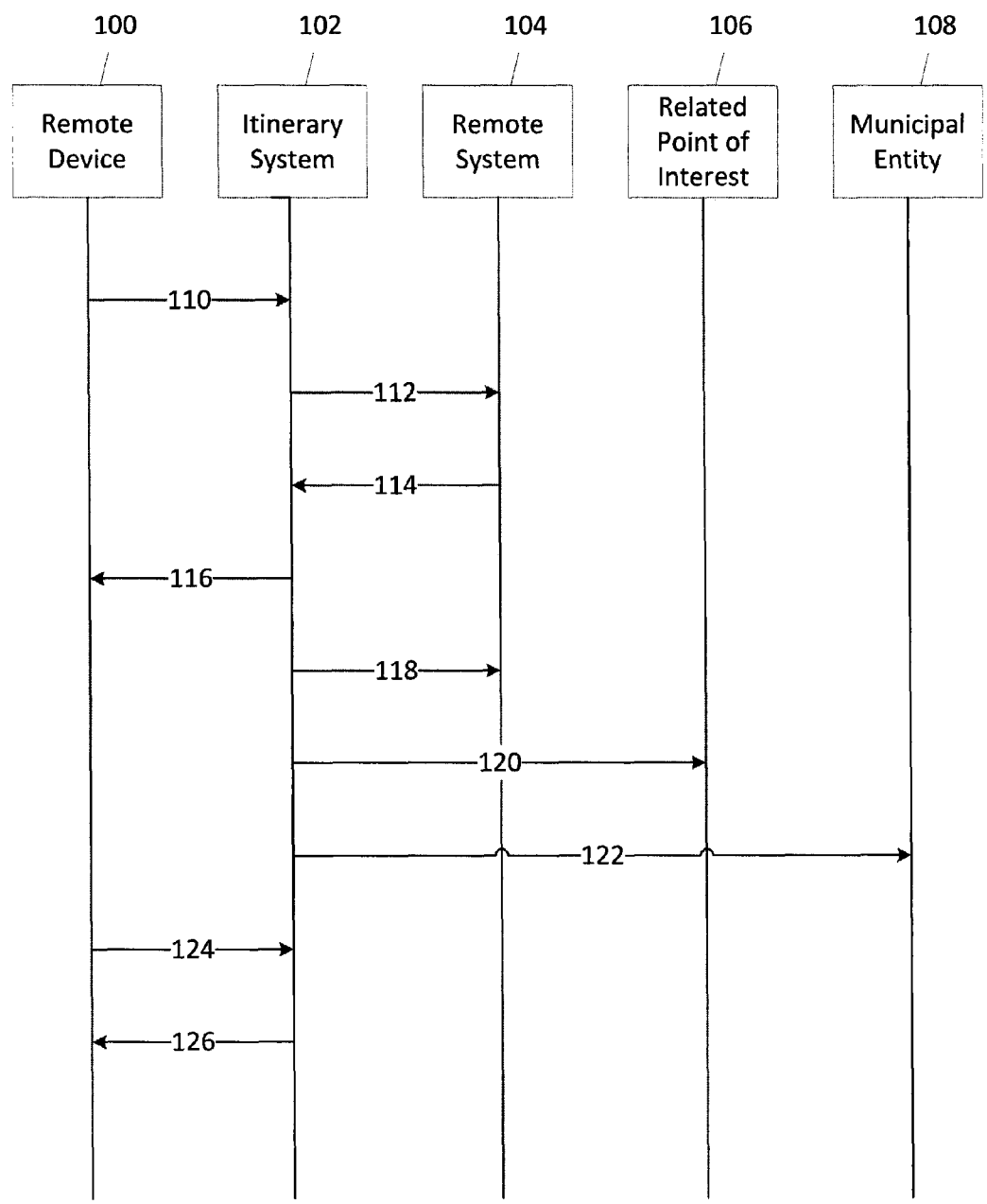
FIG. 1 is a swimlane diagram depicting communications between an itinerary system and other systems according to embodiments.

For the purposes of explanation, the ensuing description provides specific details that are set forth in order to provide a thorough understanding of various embodiments. It will be apparent, however, to one skilled in the art that various embodiments may be practiced without some of these specific details. For example, circuits, systems, networks, processes, and other components may be shown as components in block diagram form in order not to obscure the embodiments in unnecessary detail. In other instances, known circuits, processes, algorithms, structures, and techniques may be shown without unnecessary detail in order to avoid obscuring the embodiments. In other instances, well-known structures and devices are shown in block diagram form.

Embodiments of the invention provide systems and methods for providing custom itineraries to a remote device. Such itineraries may be designed to reduce transportation costs and/or times, reduce wait times at points of interest, make plans based on weather forecasts, organize and/or otherwise increase the efficiency of an itinerary. While such advantages to a traveler associated with the creation of the itinerary are apparent, other entities may also benefit. For example, an operator of an itinerary creation system, as well as businesses, transit operators, and/or operators of points of interest may utilize the itineraries and/or information used in the creation of the itinerary. Such entities may receive information based on the itineraries to better predict customer/visitor flow at a particular day and/or time. The information may alert the points of interest that a particularly large or small amount of customer traffic may be expected, allowing the points of interest to staff accordingly. This may be particularly useful for situations where a special event is taking place. By having better flow predictions, businesses may be better able to manage their resources.

Embodiments allow users to plan entire outings and/or trips by selecting points of interest on a map, list, or other user interface. The user may select parameters for each point of interest, such as how long they plan to stay at each point of interest, a preferred time of day or type of weather for each point of interest, wait times, and the like. Based on the information received from a user, an itinerary system may utilize information from one or more of the points of interest to generate an itinerary. In some embodiments, the itinerary system may provide a suggested duration of a visit to a particular point of interest along with the itinerary. The organization of the itinerary may be based on the suggested duration. This suggested duration may be based on, for example, historical data from the point of interest that shows how long visitors typically spend at the particular point of interest. In some embodiments, a user may override the suggested duration and enter in a personalized duration, either along with the itinerary request or after the itinerary has been received.

In some embodiments, the itinerary system includes a server configured to produce an itinerary based on a selection of a number of points of interest. The server may include a communications interface configured to enable the transfer of information. The communications interface may provide hardware configured to facilitate communication using one or more protocols, such as network connections like the Internet, Bluetooth, radio communications, other wireless communications, and the like. Information may be transferred between the server and one or more remote devices and/or remote systems. As used herein, remote devices and systems are those in communication with the itinerary system and do not process data to produce itineraries. The remote devices and systems are at different locations than the itinerary system. Remote devices may include a kiosk or other standalone device that enables access to the itinerary system. Remote devices may also include mobile devices, such as cellular phones and tablet devices. These remote devices may connect to the communication interface using a mobile application or other software and/or using a website. Remote systems may include computers and/or servers associated with one or more points of interest, transit authorities, and/or municipal entities, such as law enforcement or health agencies.

The server may also include a memory configured to store the information obtained from one or more remote systems. For example, information regarding hours of operation, entry costs, and the like may be received from one or more remote systems and be stored in the server memory. The stored information may then be recalled by the server in subsequent itinerary requests to help produce and organize the subsequent itinerary. In some embodiments, the information may include historical data from one or more points of interest that show how much time visitors typically spend at one or more of the points of interest. This information may be used to provide a suggested duration for each of the points of interest on an itinerary.

In some embodiments, the server may include a processor. The processor may be configured to receive a request for an itinerary from a remote device. In some embodiments, the request may be received using the communications interface. The request may include a plurality of points of interest to be included in an itinerary. For example, a traveler or other user may interact with a remote device to select one or more attractions or points of interest to include in the request received by the server. Such points of interest may include tourist attractions, restaurants, retail businesses, monuments, and the like. In some embodiments, the request may include a time or time range. For example, the time may be a specific time a user wishes to visit a certain point of interest or a time period within which the user wishes to visit the point of interest.

The processor may be further configured to communicate with the remote systems to obtain information related to the points of interest. Such information may include hours of operation, a cost of entry, expected lines, and/or expected wait times. The information may also include historical data of average visit duration. The information obtained from the remote systems may be used by the server to help produce and organize itineraries. For example, the server may analyze the hours of operation and expected wait times at various times of day to schedule a visit to a point of interest during a low visitation traffic timeframe. Other factors, such as weather forecasts, expected road traffic, and/or transit schedules may be further used to organize an itinerary. For example, if a user selects an indoor and an outdoor point of interest on a day with an afternoon rain shower forecast, the server may schedule the indoor point of interest to be visited in the morning while the weather is expected to be better. The outdoor point of interest may then be scheduled during the afternoon rain showers. As another example, the server may analyze possible transit routes, expected traffic patterns and volumes and/or transit schedules. Using this analysis, the server may organize the itinerary to be based on transportation efficiency.

In some embodiments a prioritization order may be received by the server. The prioritization order may include a cost, the time or time period, wait times, traffic, and/or weather. The prioritization order may determine on which criteria the organization of the itinerary is based. For example, the prioritization order may be based on minimizing wait times. The itinerary system may analyze expected wait times throughout the day for each attraction and produce an itinerary that minimizes wait times, allowing visitors to maximize time on their visit. In some embodiments, the prioritization request may include more than one criterion from which the organization of the itinerary is based. In some embodiments, the itinerary request may include a mode of transportation such that the server can organize an itinerary based on the traveler using one or more predetermined modes of transportation. For example, a user may have a vehicle and prefer to drive, or a user may prefer using public transit options.

The processor may be configured to produce an itinerary that includes the plurality of points of interest. The itinerary may be organized based at least in part on the information obtained from the one or more remote systems, the time or time range, the prioritization order, transit selections, and the like. In some embodiments, multiple itineraries may be produced to allow a user to choose from a few options.

In some embodiments, the processor may also provide a suggested transit route having directions to at least one of the plurality of points of interest. The transit route may include a map and/or driving directions, a public transit route and schedule, and/or other information that may help a user determine how and when to get to the points of interest on the itinerary. The processor may also provide the itinerary to the remote device. For example, the processor may transmit an electronic copy of the itinerary via a website, mobile application or other software, via an email or short message service (SMS) message, and/or any other electronic service. The user may then view the itinerary on the remote device. The electronic copy of the itinerary may be sent to other remote devices, may be printed, and/or may be saved on the remote device.

Table 1 below shows a sample of an itinerary that may be produced by an itinerary system as described herein. The itinerary may include dates of visits to one or more points of interest, as well as information such as weather forecasts. Transit directions to and from points of interest, here restaurants, a zoo, a stadium, and a hotel, are provided. The transit directions may include travel times, directions, modes of transportation and the like. Here a light rail schedule with a rail line and station names are provided. Itineraries may include time information, addresses, contact information, and other data that may aid a user in keeping on schedule with the itinerary. It will be appreciated that Table 1 merely provides one example of an itinerary that may be produced using an itinerary system as described herein. Other itineraries may include more or less information that may be provided in different formats.

TABLE 1

| Travel Itinerary | | | |
| --- | --- | --- | --- |
| Trip Start: | | Oct. 14, 2014 | |
| Trip End: | | Oct. 15, 2014 | |
| Weather | | | |
| | Morning | Afternoon | Evening |
| | 65 - partly cloudy | 78 - sunny | 70 - calm |
| Light Rail | | | |
| Time | Starting Station | Final Station | Line |
| 8:05 AM | Union Station | Broadway | D - North |
| Breakfast @ Diner | | | |
| Time | Reservation | Address | Phone Number |
| 8:35 AM | Yes - 4 | 555 Broadway | 555-555-5555 |
| Exploration | | | |
| Time | | Location | |
| 10:00 AM | | Downtown | |
| Baseball Game | | | |
| Time | Location | Teams | Ticket Price |
| 11:00 AM | 556 Broadway | Warriors @ Poets | $25/person |
| Ice Cream | | | |
| Time | | Location | |
| 2:30 PM | | 557 Broadway | |
| Light Rail | | | |
| Time | Starting Station | Final Station | Line |
| 3:15 PM | Broadway | Main | M - South |
| Zoo | | | |
| Time | Location | Ticket Cost | |
| 3:50 PM | 900 Main | $20/person | |
| Dinner @ Joe's | | | |
| Time | Reservation | Address | Phone Number |
| 7:15 AM | Yes - 4 | 901 Main | 555-555-5556 |
| Light Rail | | | |
| Time | Starting Station | Final Station | Line |
| 8:45 PM | Main | Union Station | D - South |

TABLE 1-continued

Travel Itinerary

HOTEL

| Time | Confirm # | Address | Room | Check-Out | Date |
|---|---|---|---|---|---|
| 8:55 PM | 123456789 | 555 Union | 110 | 9:00 AM | Oct. 15, 2014 |

In some embodiments, the processor may aggregate data from a number of itineraries created by the server. The data may include, for example, a date of a visit scheduled on an itinerary, a time of the visit, and/or an estimated number of people for the visit. As the data from a number of itineraries is combined, an estimate of expected visitors, as well as expected times of heavy visitor volume, may be calculated. These estimates, as well as the actual data from the itineraries may be useful to the points of interest in allocating resources, such as staff. The processor may provide at least a portion of the data to one of the plurality of points of interest. This data may also be useful to other attractions and points of interest located proximal to the points of interest on the itinerary, as well as to municipal and transit entities. For example, a municipal entity, such as police departments, fire departments, paramedics and other medical staff, and the like may benefit from knowing when there may be an unusually large gathering of people at a particular time, such as for an event. The information may be useful for such municipal entities to allocate staff and maintain order. Transit entities, such as bus, rail, and cab systems, may find such information useful both to know when and where to send extra vehicles, as well as to help avoid especially heavy traffic for transit users that are not taking part in an event or headed to a particular point of interest. Businesses and attractions proximate to the points of interest on the itineraries may also benefit as they may be alerted of a particularly large volume of visitors to their vicinity that may result in higher amounts of visitors to the business.

Referring now to FIG. 1, a swimlane diagram of the interaction of an itinerary system with other devices and systems is shown. A remote device 100 may communicate a request for an itinerary 110 with an itinerary system 102. The itinerary request 110 may include one or more points of interest that a user wishes to visit. These points of interest may then be included on an itinerary produced by the itinerary system 102. The request may also include a specific time and/or a time range within which the user wishes to visit one or more of the points of interest. In some embodiments, the itinerary request 110 may also include a prioritization order that may determine how points of interest on the itinerary will be scheduled. For example, an order of importance to visit, a cost of entry, the time or time period during which the user desires to visit the points of interest, wait times, traffic, and/or weather may be included in the prioritization order. In some embodiments, the request may include multiple criteria in the prioritization order such that the itinerary system 102 may better produce an itinerary based on the user's needs.

Based on the itinerary request 110, the itinerary system 102 may transmit a request for data 112 to one or more remote systems 104. The remote systems 104 may be associated with the one or more points of interest from the itinerary request 110 or may be linked to other information sources, such as traffic or weather monitoring systems. The remote systems 104 may send back information 114 that is related to the points of interest back to the itinerary system 102. The information 114 may include hours of operation, a cost of entry, expected lines, or expected wait times for one or more of the points of interest. The itinerary system 102 may then use this information 114, along with the itinerary request 110, to produce an itinerary that includes the points of interest. The itinerary system 102 may also produce a suggested transit route to one or more of the points of interest. In some embodiments, the itinerary system 102 may communicate with a transit authority to get this information, while in other embodiments; the itinerary system may have transit schedules and maps stored locally for use in creating itineraries and transit routes. The itinerary 116 and/or the transit route may be sent to the remote device 100.

In some embodiments, the itinerary, transit route, and/or other information 118 associated with one or more itineraries may be sent to one or more of the remote systems 104. For example, information related to a number of people and/or a time a user or group intends to visit a point of interest may be sent to the remote system 104 associated with the point of interest. This allows the point of interest to efficiently plan out the allocation of resources, such as staff. In some embodiments, data related to the itinerary 120 may be sent to a related point of interest 106. For example, the related point of interest 106 may be a business or attraction that is located near one of the points of interest on one or more itineraries. The related point of interest 106 may see additional visitors that are in the area visiting the point of interest on the itineraries. As such, the data may be useful for the related point of interest 106 to allocate its resources as well. In other embodiments, visitor data 122 may be sent to a municipal entity 108, such as a transit authority, law enforcement agency, fire department, medical agency, and the like. The municipal entity 108 may also use this visitor data 122 to determine how to allocate resources. For example, extra buses, trains, or taxis may be scheduled based on increased visitor flow. When larger than normal crowds are expected, additional law enforcement and/or medical personnel may be placed near a point of interest or other attraction.

In some embodiments, the remote device 100 may remain in communication with the itinerary system 102 after receiving the itinerary. For example, when the remote device 100 is a mobile device, the location services of the remote device 100, such as global positioning satellite (GPS) sensors and wireless sensors, may be used to monitor the progress of the user's visit based on the itinerary. If a user falls behind or gets ahead of schedule, the remote device 100 may notify the itinerary system 102, which can then adjust the itinerary and/or transit route. The adjusted itinerary 126 may then be sent back to the remote device 100. Additional features of a mobile device, such as applications that monitor traffic, weather, and other outside factors, may also be useful in updating an itinerary. For example, should a weather forecast change, the itinerary system 102 may send an updated itinerary to the remote device 100 and alert the user of the change in schedule. In some embodiments, the itinerary system 102 may monitor a user's progress based on tracking their transit smartcard. The user may identify themselves using the remote device 100, such as a kiosk or mobile device. A transit account may be associated with the user, such that use of the transit smartcard for the transit account of the user may alert the itinerary system 102 if a user is ahead of, or behind schedule. The itinerary system 102 may then make adjustments and provide an updated itinerary to the remote device 100. Additionally, information from tracking transit smartcards may be used as historical data by the itinerary system 100 to determine average visitation lengths for points of interest. This historical data may then be used to provide suggested durations to the user, and may be used to organize and schedule itineraries produced by the itinerary system 102.

Figure 2:
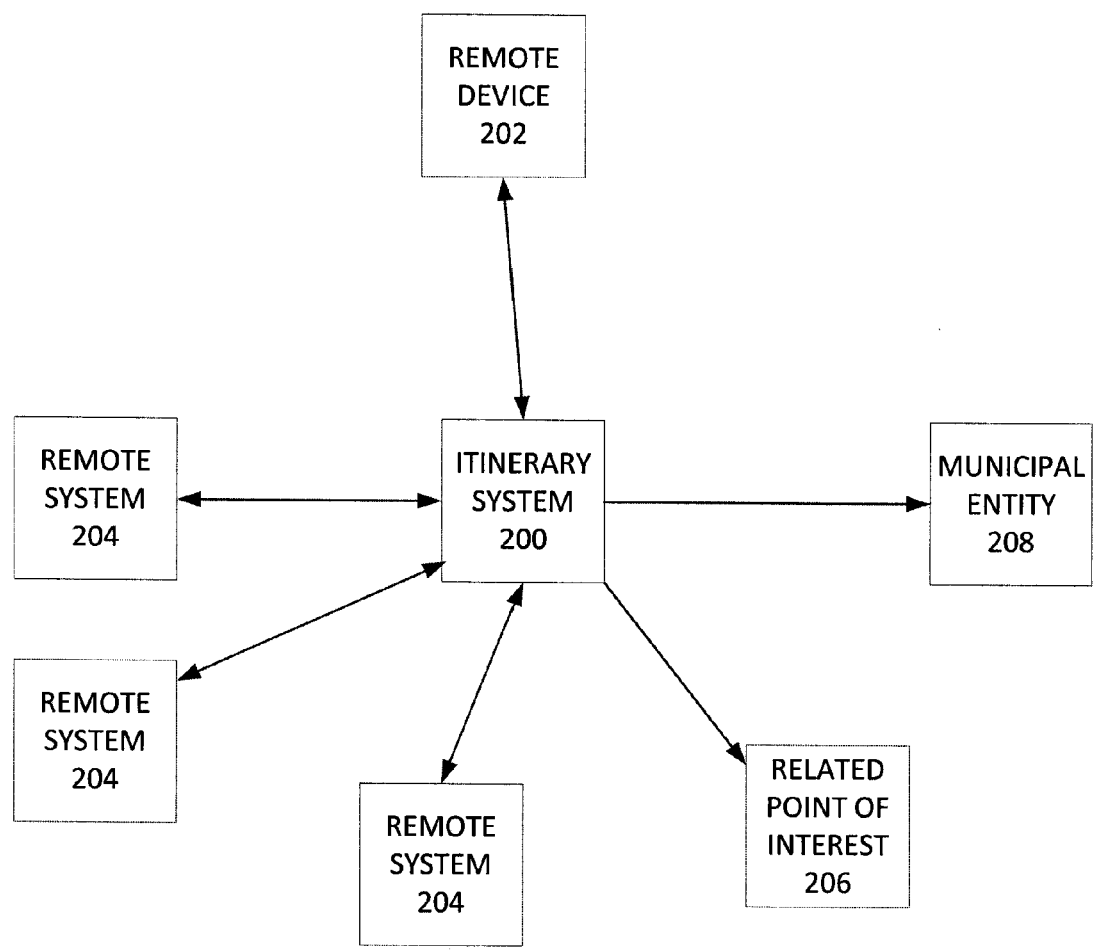
FIG. 2 is a system diagram depicting connections between an itinerary system and other systems over a network according to embodiments.

FIG. 2 is a system diagram showing the interconnectivity of systems and devices, such as those shown in FIG. 1. The devices and/or systems may be connected via one or more public and/or private networks. For example, an itinerary system 200 may be in communication with a remote device 202. The remote device 202 may transmit information, such as itinerary requests, location data, weather, information, and traffic information to the itinerary system 200. The itinerary system 200 may send itineraries and updated itineraries to the remote device 202. The itinerary system 200 may also be connected to one or more remote systems 204. Remote systems 204 may include computer systems associated with one or more points of interest. Remote systems 204 may also include computer systems that monitor traffic flow, transit systems, weather conditions, and the like. The itinerary system 200 may contact one or more remote systems 204 based on information received in an itinerary request from the remote device 202. The itinerary system 200 may then receive data back from the remote systems 204 that may be used in organizing and producing an itinerary. For example, the itinerary request may include two points of interest. The itinerary system 200 may request information from remote systems 204 associated with the two points of interest, as well as a remote system 204 that has access to transit schedules. The remote systems 204 for the points of interest may send information such as hours of operation and expected wait times to the itinerary system 200, while the remote system 204 with access to the transit schedule may send a transit route for a user to get to the points of interest. The itinerary system 200 may also send the finished itinerary to the one or more remote systems 204 such that the points of interest may more efficiently allocate their resources. The itinerary system 200 may also send the itinerary to related points of interest 206 and/or to one or more municipal entities 208 such that resources may be allocated efficiently as described herein.

In some embodiments, the method may include receiving historical data related to average visitation lengths at one or more of the plurality of points of interest. The historical data may be received from one or more of the remote systems associated with the points of interest. A suggested duration of a visit to at least or more of the plurality of points of interest may be provided to the remote device. The suggest duration may be based at least in part on the historical data. In some embodiments, the suggested duration may be provided to the remote device as part of the itinerary, with the itinerary having been produced based on the suggested duration of one or more points of interest. In other embodiments, the suggested duration may be provided to the remote device separately from the itinerary. In some embodiments, a user may have the option to override the suggested duration by selecting a custom duration for one or more points of interest. This may be selected and included with the itinerary request and/or may be selected after the itinerary and/or suggested durations have been received.

Figure 3:
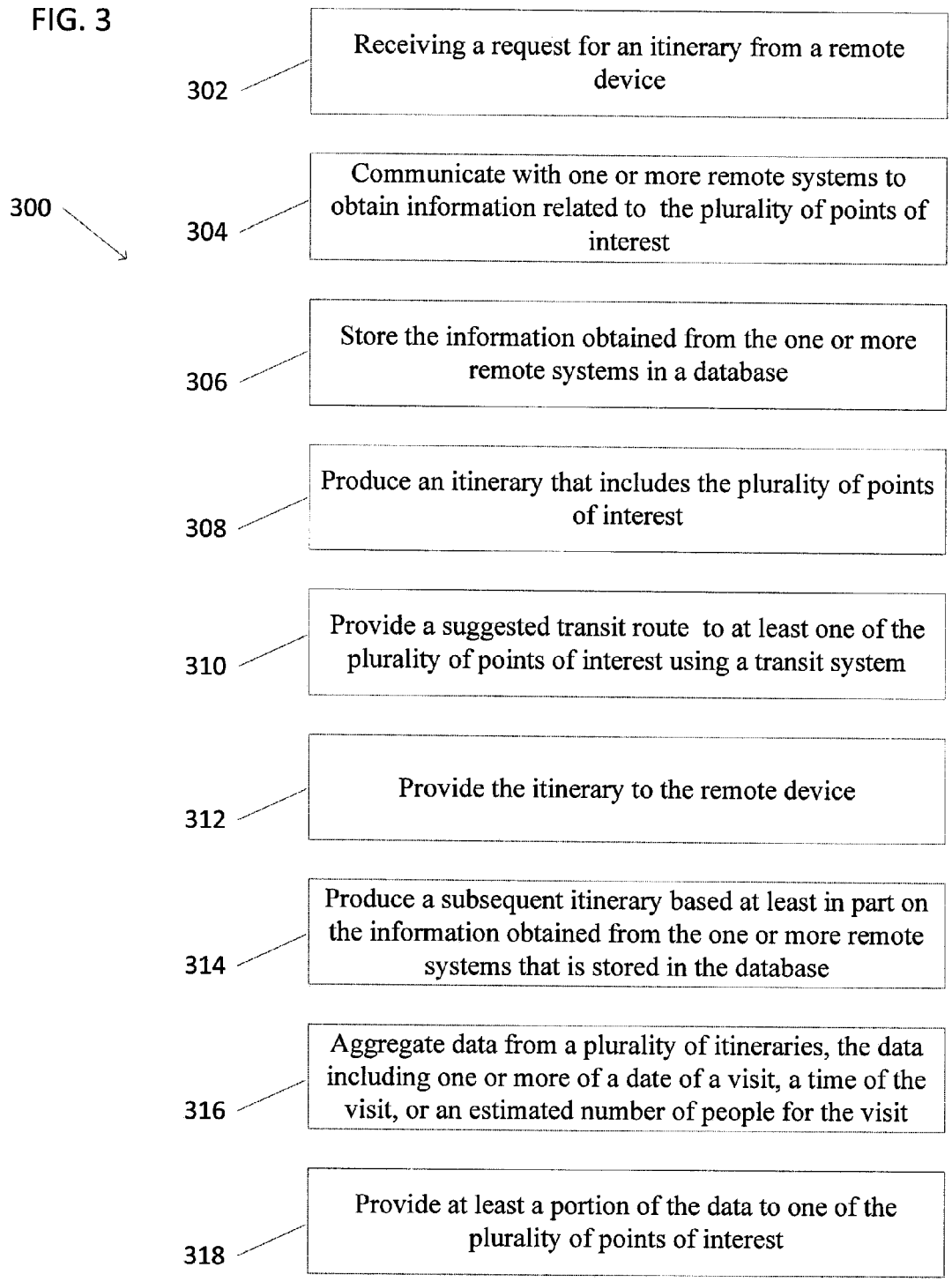
FIG. 3 is a flowchart depicting a process for producing an itinerary according to embodiments.

FIG. 3 depicts a method 300 for producing an itinerary and travel route based on a selection of a number of points of interest. The method may be conducted by an itinerary system such as itinerary system 102, server, and/or kiosk or other device. In some embodiments, the method may include receiving a request for an itinerary from a remote device at block 302. The request may include a number of points of interest to be included in the itinerary, as well as a time or time range for visiting one or more of the points of interest. In some embodiments, the request may further include a prioritization order based on cost, the time or time period, wait times, traffic, and/or weather. The prioritization order may help determine how an itinerary is to be organized by the itinerary system. At block 304, the method may include communicating with one or more remote systems to obtain information related to the plurality of points of interest. In some embodiments, this information may include hours of operation, a cost of entry, expected lines, and/or expected wait times for one or more points of interest. The information obtained from the remote systems may be stored in a database at block 306. An itinerary that includes the points of interest may be produced at block 308. The itinerary may be organized based at least in part of the information obtained from the remote systems and the time or time range. In some embodiments, traffic data and/or weather data may be received from one or more of the remote systems. This data may be used to organize the itinerary. At block 310, a suggested transit route may be provided that has directions to at least one of the plurality of points of interest using a transit system.

The itinerary may be provided to the remote device at block 312. The method may also include producing a subsequent itinerary based at least in part on the information obtained from the one or more remote systems that is stored in the database at block 314. Data may be aggregated from a number of itineraries and may include a date of a visit, a time of the visit, and/or an estimated number of people for the visit. At block 316, at least a portion of the data may be provided to one of the points of interest. In some embodiments, at least a portion of the data may be sent to a second point of interest. The points of interest may use this information for planning purposes, such as to help allocate resources. In some embodiments, the method may include providing least a portion of the data to a business entity that is in a location proximate to at least one of the points of interest and/or a municipal entity.

In some embodiments, the method may include receiving a request to obtain access media related to one or more of the plurality of points of interest or to a transportation provider. For example, access media may include transit fare or media, as well as entrance tickets to attractions and other points of interest. The itinerary system may communicate with one or more of the remote systems to obtain the access media. For example, the request may include a request to obtain a transit pass for a light rail or subway system. The itinerary system may contact a remote system of a transit authority to purchase a transit pass. The transit pass may be printed out and/or electronically transmitted to a mobile remote device for entry into a transit system.

The remote devices may be any computerized device that may connect to the itinerary system on a network. In some embodiments, the remote device may be a mobile device, such as a cellular phone or tablet device, which may communicate with the itinerary system using an application or through a website. In other embodiments, the remote device may be a kiosk or other stand-alone device that runs a software application of the itinerary system. Such kiosks may be wheelchair friendly. In other embodiments, the remote device may be a virtual ticket office or other vending machine. Such remote devices may be positioned in or near attractions, businesses, hotels, public transit stations, and/or near other points of interest. In some embodiments, the kiosk may allow a user to access the itinerary system via a website. The kiosk may include a screen that can display information related to a number of a points of interest, along with maps and other data that may aid a user in building an itinerary or list of points of interest to be included in an itinerary. Points of interest may include hotels, restaurants, transport hubs, attractions, businesses, events, and/or any other locations. The screen may be a touchscreen. In some embodiments, one or more input devices may be included, such as a keyboard, a scrolling device, a pointer device, and/or other user input devices. In touchscreen embodiments, the map may be pinched by a user's fingers to zoom in on a position of the map. The screen may be touched to reposition the map. The remote devices may be synchronized through the cloud or otherwise to allow any number of remote devices to access the same itinerary. For example, an itinerary could be formulated using a kiosk that is in communication with the itinerary system. This itinerary may then be sent to a mobile device for continued use.

Figure 4:
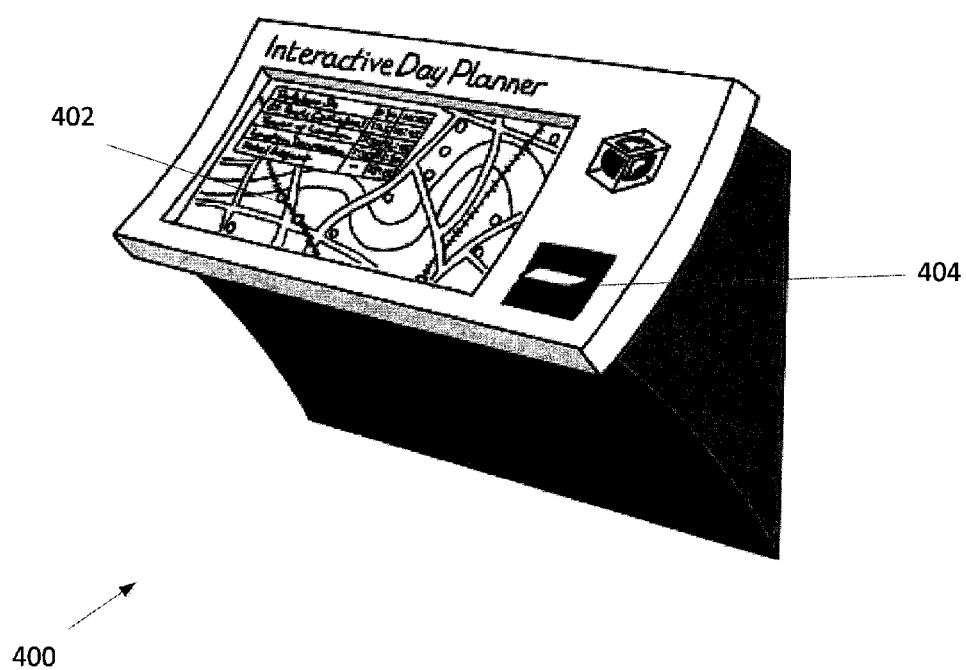
FIG. 4 shows a remote device according to embodiments.

FIG. 4 shows one embodiment of a kiosk 400 serving as a remote device that may interact with the itinerary system. While shown as kiosk 400, it will be appreciated that any device, such as a mobile device, that is connectable to a network may be used as a remote device. The kiosk 400 may include a screen 402. Screen 402 may be a touchscreen that allows a user to input information, such as one or more points of interest, a desired mode of transportation, a prioritization order, and the like. This information may be included in an itinerary request that may be sent to the itinerary system over a network. In other embodiments, the remote device or kiosk may have a separate input device, such as a keypad, mouse, stylus, or other input device. The kiosk 400 may also include a printer 404 that may be configured to print a hard copy of an itinerary received from the itinerary system. Kiosk 400 may include other hardware features, such as payment scanners, speakers, microphones, and other hardware for receiving data and conducting transactions. In some embodiments, kiosk 400 may house a server or the itinerary system. In such embodiments, a processor of kiosk 400 may be configured to perform any of the processes described in FIG. 3.

Figure 5:
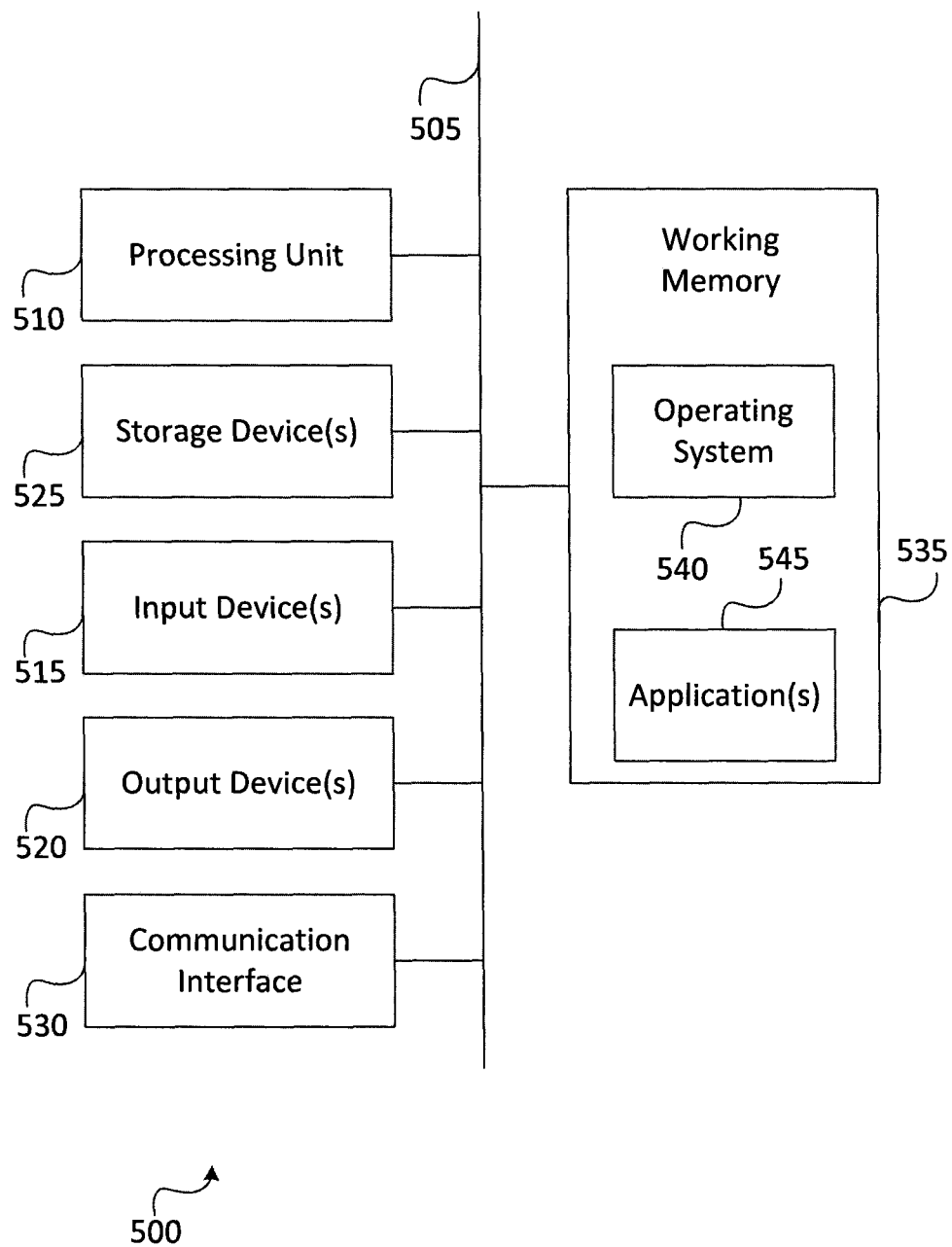
FIG. 5 is a block diagram of an example computing system according to embodiments.

A computer system as illustrated in FIG. 5 may be incorporated as part of the previously described computerized devices. For example, computer system 500 can represent some of the components of the remote device 100, itinerary system 102, and/or remote system 104, of FIG. 1, as well as itinerary system 200, remote device 202, remote systems 204, related point of interest 206, and/or municipal entity 208 of FIG. 2. Computer system 500 may also represent components of the kiosk 400 described in FIG. 4. FIG. 5 provides a schematic illustration of one embodiment of a computer system 500 that can perform the methods provided by various other embodiments, as described herein, and/or can function as the host computer system, a remote kiosk/terminal, a point-of-sale device, a mobile device, and/or a computer system. FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include a processing unit 510, including without limitation one or more general-purpose processors and/or one or more special-purpose processors (such as digital signal processing chips, graphics acceleration processors, and/or the like); one or more input devices 515, which can include without limitation a mouse, a keyboard, a touchscreen, receiver, a motion sensor, a camera, a smartcard reader, a contactless media reader, and/or the like; and one or more output devices 520, which can include without limitation a display device, a speaker, a printer, a writing module, and/or the like.

The computer system 500 may further include (and/or be in communication with) one or more non-transitory storage devices 525, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 500 might also include a communication interface 530, which can include without limitation a modem, a network card (wireless or wired), an infrared communication device, a wireless communication device and/or chipset (such as a Bluetooth™ device, an 502.11 device, a WiFi device, a WiMax device, an NFC device, cellular communication facilities, etc.), and/or similar communication interfaces. The communication interface 530 may permit data to be exchanged with a network (such as the network described below, to name one example), other computer systems, and/or any other devices described herein. In many embodiments, the computer system 500 will further comprise a non-transitory working memory 535, which can include a RAM or ROM device, as described above.

The computer system 500 also can comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 525 described above. In some cases, the storage medium might be incorporated within a computer system, such as computer system 500. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, an journey planning and pricing engine configured to provide some or all of the features described herein relating to the journey planning and/or pricing can comprise hardware and/or software that is specialized (e.g., an application-specific integrated circuit (ASIC), a software method, etc.) or generic (e.g., processing unit 510, applications 545, etc.) Further, connection to other computing devices such as network input/output devices may be employed.

Some embodiments may employ a computer system (such as the computer system 500) to perform methods in accordance with the disclosure. For example, some or all of the procedures of the described methods may be performed by the computer system 500 in response to processing unit 510 executing one or more sequences of one or more instructions (which might be incorporated into the operating system 540 and/or other code, such as an application program 545) contained in the working memory 535. Such instructions may be read into the working memory 535 from another computer-readable medium, such as one or more of the storage device(s) 525. Merely by way of example, execution of the sequences of instructions contained in the working memory 535 might cause the processing unit 510 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 500, various computer-readable media might be involved in providing instructions/code to processing unit 510 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 525. Volatile media include, without limitation, dynamic memory, such as the working memory 535. Transmission media include, without limitation, coaxial cables, copper wire and fiber optics, including the wires that comprise the bus 505, as well as the various components of the communication interface 530 (and/or the media by which the communication interface 530 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a non-transitory storage device 525 either before or after execution by the processing unit 510.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

What is claimed is:

1. A server configured to produce an optimized itinerary based on a selection of a number of points of interest and to provide the itinerary to a user and a transit authority for planning out an allocation of transit resources, the server comprising:
   a communications interface configured to enable the transfer of information;
   a memory configured to store the information obtained from one or more remote systems; and
   a processor configured to:
      receive, using the communications interface, a request for an itinerary from a remote device, the request comprising a plurality of points of interest to be included in the itinerary, the request further comprising a time or time range;
      communicate, using the communications interface, with the one or more remote systems to obtain information related to the plurality of points of interest;
      store the information obtained from the one or more remote systems in the memory;
      produce an itinerary that includes the plurality of points of interest, wherein the itinerary is organized based at least in part of the information obtained from the one or more remote systems and the time or time range;
      provide, using the communications interface, a suggested transit route having directions to at least one of the plurality of points of interest, the suggested transit route utilizing the allocation of transit resources;
      provide, using the communications interface, the itinerary to the remote device;
      produce a subsequent itinerary based at least in part on the information obtained from the one or more remote systems that is stored in the database;
      aggregate data from a plurality of itineraries, the data including one or more of a date of a visit, a time of the visit, or an estimated number of people for the visit;
      provide, using the communications interface, at least a portion of the data to one of the plurality of points of interest; and
      provide at least a portion of the data to the transit authority.

2. The server configured to produce an optimized itinerary based on a selection of a number of points of interest and to provide the itinerary to a user and a transit authority for planning out an allocation of transit resources according to claim 1, wherein the processor is further configured to:
   provide, using the communications interface, at least a portion of the data to one or more of a business entity that is in a location proximate to at least one of the plurality of points of interest or a municipal entity.

3. The server configured to produce an optimized itinerary based on a selection of a number of points of interest and to provide the itinerary to a user and a transit authority for planning out an allocation of transit resources according to claim 1, wherein:
   the information comprises one or more of hours of operation, a cost of entry, expected lines, or expected wait times.

4. The server configured to produce an optimized itinerary based on a selection of a number of points of interest and to provide the itinerary to a user and a transit authority for planning out an allocation of transit resources according to claim 1, wherein the processor is further configured to:
receive historical data related to average visitation lengths at one or more of the plurality of points of interest; and
provide to the remote device a suggested duration of a visit to at least or more of the plurality of points of interest based at least in part on the historical data.

5. The server configured to produce an optimized itinerary based on a selection of a number of points of interest and to provide the itinerary to a user and a transit authority for planning out an allocation of transit resources according to claim 1, wherein the processor is further configured to:
receive, using the communications interface, traffic data or weather data from the one or more remote systems, and wherein the itinerary is organized based at least in part on the traffic data or the weather data.

6. The server configured to produce an optimized itinerary based on a selection of a number of points of interest and to provide the itinerary to a user and a transit authority for planning out an allocation of transit resources according to claim 1, wherein:
the request further comprises a prioritization order based on one or more of cost, the time or time period, wait times, traffic, or weather; and
the itinerary is organized based on the prioritization order.

7. A method for producing an itinerary and travel route based on a selection of a number of points of interest and providing the itinerary to a user and a transit authority for planning out an allocation of transit resources, the method comprising:
receiving a request for an itinerary from a remote device, the request comprising a plurality of points of interest to be included in the itinerary, the request further comprising a time or time range;
communicating, using a communications interface, with one or more remote systems to obtain information related to the plurality of points of interest;
storing the information obtained from the one or more remote systems in a database;
producing, using a processor, an itinerary that includes the plurality of points of interest, wherein the itinerary is organized based at least in part of the information obtained from the one or more remote systems and the time or time range;
providing a suggested transit route having directions to at least one of the plurality of points of interest, the suggested transit route utilizing the allocation of transit resources;
providing the itinerary to the remote device;
producing a subsequent itinerary based at least in part on the information obtained from the one or more remote systems that is stored in the database;
aggregating data from a plurality of itineraries, the data including one or more of a date of a visit, a time of the visit, or an estimated number of people for the visit;
providing at least a portion of the data to one of the plurality of points of interest; and
providing at least a portion of the data to the transit authority.

8. The method for producing an itinerary and travel route based on a selection of a number of points of interest and providing the itinerary to a user and a transit authority for planning out an allocation of transit resources according to claim 7, further comprising:
providing least a portion of the data to one or more of a business entity that is in a location proximate to at least one of the plurality of points of interest or a municipal entity.

9. The method for producing an itinerary and travel route based on a selection of a number of points of interest and providing the itinerary to a user and a transit authority for planning out an allocation of transit resources according to claim 7, wherein:
the information obtained from the one or more remote systems comprises one or more of hours of operation, a cost of entry, expected lines, or expected wait times.

10. The method for producing an itinerary and travel route based on a selection of a number of points of interest and providing the itinerary to a user and a transit authority for planning out an allocation of transit resources according to claim 7, further comprising:
receiving historical data related to average visitation lengths at one or more of the plurality of points of interest; and
providing to the remote device a suggested duration of a visit to at least or more of the plurality of points of interest based at least in part on the historical data.

11. The method for producing an itinerary and travel route based on a selection of a number of points of interest and providing the itinerary to a user and a transit authority for planning out an allocation of transit resources according to claim 7, further comprising:
receiving traffic data or weather data from the one or more remote systems, and wherein the itinerary is organized based at least in part on the traffic data or the weather data.

12. The method for producing an itinerary and travel route based on a selection of a number of points of interest and providing the itinerary to a user and a transit authority for planning out an allocation of transit resources according to claim 7, wherein the request further comprises:
a prioritization order based on one or more of cost, the time or time period, wait times, traffic, or weather, and wherein the itinerary is organized based on the prioritization order.

13. The method for producing an itinerary and travel route based on a selection of a number of points of interest and providing the itinerary to a user and a transit authority for planning out an allocation of transit resources according to claim 7, further comprising:
receiving a request to obtain access media, wherein the access media is related to one or more of the plurality of points of interest or to a transportation provider; and
communicating with the one or more remote systems to obtain the access media.

14. A non-transitory computer-readable medium having instructions embedded thereon for producing an itinerary and travel route based on a selection of a number of points of interest and providing the itinerary to a user and a transit authority for planning out an allocation of transit resources, the instructions comprising computer code for causing a computing device to:
receive a request for an itinerary from a remote device, the request comprising a plurality of points of interest to be included in the itinerary, the request further comprising a time or time range;
communicate with one or more remote systems to obtain information related to the plurality of points of interest;
store the information obtained from the one or more remote systems in a database;

produce an itinerary that includes the plurality of points of interest, wherein the itinerary is organized based at least in part of the information obtained from the one or more remote systems and the time or time range;

provide a suggested transit route having directions to at least one of the plurality of points of interest, the suggested transit route utilizing the allocation of transit resources;

provide the itinerary to the remote device;

produce a subsequent itinerary based at least in part on the information obtained from the one or more remote systems that is stored in the database;

aggregate data from a plurality of itineraries, the data including one or more of a date of a visit, a time of the visit, or an estimated number of people for the visit;

provide at least a portion of the data to one of the plurality of points of interest; and provide at least a portion of the data to the transit authority.

15. The non-transitory computer-readable medium according to claim 14, further comprising instructions for causing the computing device to:

provide least a portion of the data to one or more of a business entity that is in a location proximate to at least one of the plurality of points of interest or a municipal entity.

16. The non-transitory computer-readable medium according to claim 14, wherein:

the information comprises one or more of hours of operation, a cost of entry, expected lines, or expected wait times.

17. The non-transitory computer-readable medium according to claim 14, further comprising instructions for causing the computing device to:

receive historical data related to average visitation lengths at one or more of the plurality of points of interest; and provide to the remote device a suggested duration of a visit to at least or more of the plurality of points of interest based at least in part on the historical data.

18. The non-transitory computer-readable medium according to claim 14, further comprising instructions for causing the computing device to:

receive traffic data or weather data from the one or more remote systems, and wherein the itinerary is organized based at least in part on the traffic data or the weather data.

19. The non-transitory computer-readable medium according to claim 14, wherein the request further comprises:

a prioritization order based on one or more of cost, the time or time period, wait times, traffic, or weather, and wherein the itinerary is organized based on the prioritization order.

20. The non-transitory computer-readable medium according to claim 14, further comprising instructions for causing the computing device to:

receive a request to obtain access media, wherein the access media is related to one or more of the plurality of points of interest or to a transportation provider; and communicate with the one or more remote systems to obtain the access media.

\* \* \* \* \*